H. W. Knight,
Pick Handle.
No. 71,184. Patented Nov. 19, 1867.
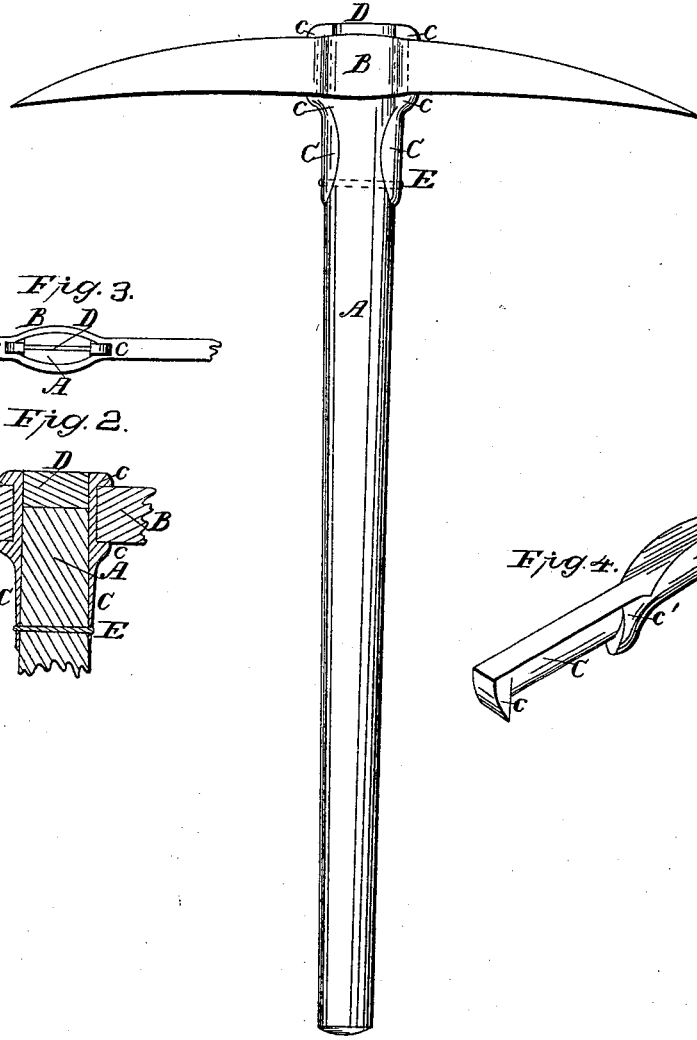
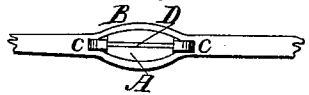
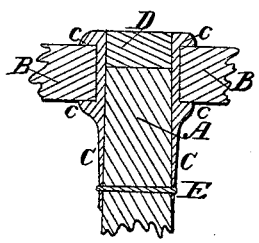
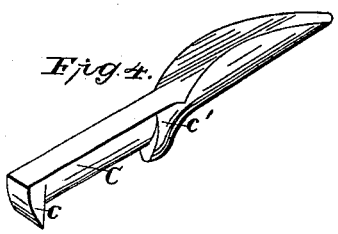
Witnesses:
J. P. Peyton
Baltis D. Long
Inventor:
Henry W. Knight
by his Attys
Balanun Hun

UNITED STATES PATENT OFFICE.

HENRY W. KNIGHT, OF COLUMBUS, OHIO.

IMPROVEMENT IN ATTACHING PICKS TO HANDLES.

Specification forming part of Letters Patent No. 71,184, dated November 19, 1867.

*To all whom it may concern:*

Be it known that I, HENRY W. KNIGHT, of Columbus, in the county of Franklin and State of Ohio, have invented a new and Improved Method of Attaching Handles to Picks, of which the following is a full, clear, and exact description, reference being had to the accompanying drawings, which make part of this specification, and in which—

Figure 1 represents a side view of a pick to which my improvement is applied; Fig. 2, a vertical central section through the same; Fig. 3, a plan or top view of the same, and Fig. 4 a view in perspective of one of the fastening-straps.

It is the object of my invention securely to attach the pick to the handle, so as to prevent the blade from either flying off or slipping up the handle, and yet to allow the blade and handle readily to be detached when required; and to these ends the invention herein claimed consists in combining the blade and handle by straps, (which clasp the back and front of the handle, fit snugly in the eye, and have projecting shoulders above and below the blade,) a bolt passing through the handle and straps, and a wedge to distend the handle in the eye, all these parts being constructed as hereinafter described.

To carry out my invention I prefer to make the pick from a solid bar of iron having the eye punched out by proper mechanism and the ends tipped with steel. It is obvious, however, that my invention can be applied to the pick commonly used without altering the pick.

The straps C are made in the form shown in Fig. 4 of the drawings, their lower parts being shaped to fit the handle and their upper outer portions to fit the eye. Projections $c\,c'$ are also formed above and below the blade to hold it rigidly and prevent it from either flying off or slipping up the handle.

To attach the blade to the handle the two straps C are placed inside the eye at its back and front. A handle, A, of the form ordinarily used, is then inserted into the eye between the straps, so as to project beyond the convex side of the blade. The handle thus wedges the straps securely in place, the projections $c\,c'$ overlapping the upper and under sides of the blade and locking it firmly in position. A bolt, E, is then passed transversely through the handle and straps and holds all the parts securely together. For greater security an iron wedge, D, such as used in ordinary picks, is driven into the upper end of the handle to make it fit snugly into the eye.

By arranging the projections $c\,c'$ outside of the pick, instead of countersinking them into it, I render the pick stronger and cheapen the cost of manufacture, and by extending the handle through and beyond the eye I obtain a longer socket and correspondingly strengthen the handle. The blade and handle can easily be separated by removing the pin E. As the straps cover the back and front of the handle, they prevent it from being cut or bruised by striking against stones or other hard substances.

I am aware that the blades and handles of picks have heretofore been united by straps and bolts, and do not broadly claim such device, although in all such devices with which I am acquainted the handle does not project through the blade, but is fastened to it by wedges and keys, which mode of connection I regard as cumbrous, expensive, and inefficient.

I am also aware that a hammer has been connected to its handle by countersunk straps at its sides, and do not claim this device.

Having thus fully described the construction of my improved pick, what I claim therein as new, and desire to secure by Letters Patent, is—

The combination of the blade, the handle, the overlapping straps, the fastening-bolt, and the wedge, when all these parts are constructed and arranged as described, for the purposes set forth.

In testimony whereof I have hereunto subscribed my name.

HENRY W. KNIGHT.

Witnesses:
 J. W. BALDWIN,
 MICHAEL B. GILBERT.